UNITED STATES PATENT OFFICE.

M. A. BUTLER, OF MARIANA, FLORIDA.

IMPROVEMENT IN COMPOSITIONS FOR SOAP.

Specification forming part of Letters Patent No. 30,561, dated November 6, 1860.

*To all whom it may concern:*

Be it known that I, M. A. BUTLER, of Mariana, in the county of Jackson and State of Florida, have invented a new and Improved Composition for Soap; and I do hereby declare that the following is a full, clear, and exact description of the same.

The object of this invention is to produce a soap which can be used in water containing mineral or metallic substances equally as well as in ordinary soft or pure water; and my invention consists in a certain compound of white soap known as "opodeldoc soap," and commonly used by druggists for liniments, and of a small quantity of salt-water soap—such as is used by sea-going persons—mixed with spirits of ammonia in a certain proportion, and colored, if desired, so as to produce a soap which has the appearance of ordinary or fancy soap, and which can be used in water containing mineral or metallic substances without inconvenience.

The proportion in which I mix the above-named ingredients is about as follows: opodeldoc soap, six pounds; salt-water soap, one-fourth pound; spirits of ammonia, one ounce.

The opodeldoc which I use is prepared as follows: rectified alcohol, eight pints; white soap, twenty ounces; liquor ammonia, four ounces. Dissolve the soap in the alcohol by a gentle heat, add the ammonia, and bottle while warm. The salt-water soap which I use is composed as follows: unsalted soap, one hundred and twenty parts; pipe-clay, one hundred parts; calcined potash-lye, from eighty to ninety parts. The two first-named ingredients are dissolved in water to pulp, the lye is added, and the whole boiled till of a proper consistency.

The opodeldoc soap is pared off in thin slices by a carpenter's plane, or with a knife, and mixed with the required quantity of salt-water soap reduced to thin slices in the same manner. Thus prepared, these ingredients are introduced into a vessel containing one and one-half gallon of boiling water, and well stirred until they have completely dissolved. I now add one (1) ounce of spirits of ammonia, and if it is desired to color the soap I use Chinese vermilion, a very small quantity—say from one-half to one tea-spoonful—of this substance dissolved in warm water and mixed with the soap composition, until the latter has attained the desired color. The mixture is now poured out in suitable vessels and left to cool, which takes about twenty-four hours, and it is then ready for use.

The several ingredients of this compound are mixed together in such a proportion that the union of all resists the decomposing effects of salts and minerals which are mixed with water in many parts of this and other countries, and which make the use of common soap, to say the least, very inconvenient.

My soap can be made very cheap, and with little trouble, and it will be found very convenient, especially in places where soft water is scarce and not easily obtained.

What I claim as new, and desire to secure by Letters Patent, is—

The within-described soap, composed of the ingredients herein specified, and mixed together in about the proportion described, for the purposes set forth.

M. A. BUTLER.

Witnesses:
C. M. GRAVES,
WILLIAM GARNER.